US012267847B2

(12) United States Patent
Takeda et al.

(10) Patent No.: US 12,267,847 B2
(45) Date of Patent: Apr. 1, 2025

(54) SEARCH SPACE SHARING FOR CROSS-CARRIER SCHEDULING

(71) Applicant: QUALCOMM Incorporated, San Diego, CA (US)

(72) Inventors: Kazuki Takeda, Tokyo (JP); Peter Gaal, San Diego, CA (US); Huilin Xu, Temecula, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/804,969

(22) Filed: Jun. 1, 2022

(65) Prior Publication Data

US 2022/0394747 A1 Dec. 8, 2022

Related U.S. Application Data

(60) Provisional application No. 63/202,297, filed on Jun. 4, 2021.

(51) Int. Cl.
*H04W 72/12* (2023.01)
*H04W 72/23* (2023.01)

(52) U.S. Cl.
CPC .................................. *H04W 72/23* (2023.01)

(58) Field of Classification Search
CPC ........................... H04W 72/23; H04W 72/1289
See application file for complete search history.

(56) References Cited

U.S. PATENT DOCUMENTS

| 2012/0078933 | A1* | 3/2012 | Kim | H04L 5/0053 |
| | | | | 707/E17.014 |
| 2020/0413335 | A1 | 12/2020 | Lu et al. | |
| 2021/0006376 | A1* | 1/2021 | Cirik | H04L 5/0094 |
| 2022/0264461 | A1* | 8/2022 | Chen | H04W 72/0446 |
| 2023/0156700 | A1* | 5/2023 | Liu | H04W 24/08 |
| | | | | 370/329 |
| 2023/0397191 | A1* | 12/2023 | Bagheri | H04W 72/52 |

FOREIGN PATENT DOCUMENTS

CN 111083770 A 4/2020

OTHER PUBLICATIONS

International Search Report and Written Opinion—PCT/US2022/072718—ISA/EPO—Sep. 27, 2022.
Panasonic: "BD/CCE/Search Space Limit for Search Space Sharing", 3GPP TSG RAN WG1 Meeting #95, R1-1813483, 3rd Generation Partnership Project, Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018, XP051555529, 3 Pages, p. 1, Paragraph 2 p. 3, Paragraph 3.

* cited by examiner

*Primary Examiner* — Derrick V Rose
(74) *Attorney, Agent, or Firm* — Harrity & Harrity, LLP

(57) ABSTRACT

Various aspects of the present disclosure generally relate to wireless communication. In some aspects, a mobile station may transmit a capability indication identifying a search space sharing capability for the mobile station on a scheduling cell. The mobile station may monitor, on the scheduling cell, a first set of physical downlink control channel (PDCCH) monitoring occasions scheduling a scheduled cell and a second set of PDCCH monitoring occasions scheduling the scheduling cell. Numerous other aspects are described.

30 Claims, 11 Drawing Sheets

SEARCH SPACE SHARING FOR CROSS-CARRIER SCHEDULING

CROSS-REFERENCE TO RELATED APPLICATION

This Patent Applications claims priority to U.S. Provisional Patent Application No. 63/202,297, filed on Jun. 4, 2021, entitled "SEARCH SPACE SHARING FOR CROSS-CARRIER SCHEDULING," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for search space sharing for cross-carrier scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes transmitting, by the mobile station, a capability indication identifying a search space sharing capability for the mobile station on a scheduling cell; and monitoring, by the mobile station and on the scheduling cell, a first set of physical downlink control channel (PDCCH) monitoring occasions scheduling a scheduled cell and a second set of PDCCH monitoring occasions scheduling the scheduling cell.

In some aspects, a method of wireless communication performed by a network entity includes receiving, by the network entity, a capability indication identifying a search space sharing capability for a mobile station on a scheduling cell; and transmitting, by the network entity and on the scheduling cell, a first set of PDCCH communications scheduling the scheduled cell and a second set of PDCCH communications scheduling the scheduling cell.

In some aspects, a mobile station for wireless communication includes a memory and one or more processors, coupled to the memory, configured to: transmit a capability indication identifying a search space sharing capability for the mobile station on a scheduling cell; and monitor, on the scheduling cell, a first set of PDCCH monitoring occasions scheduling a scheduled cell and a second set of PDCCH monitoring occasions scheduling the scheduling cell.

In some aspects, a network entity for wireless communication includes a memory and one or more processors, coupled to the memory, configured to: receive a capability indication identifying a search space sharing capability for a mobile station on a scheduling cell; and transmit, on the scheduling cell, a first set of PDCCH communications scheduling the scheduled cell and a second set of PDCCH communications scheduling the scheduling cell.

In some aspects, a non-transitory computer-readable medium storing a set of instructions for wireless communication includes one or more instructions that, when executed by one or more processors of a mobile station, cause the mobile station to: transmit a capability indication identifying a search space sharing capability for the mobile station on a scheduling cell; and monitor, on the scheduling cell, a first set of PDCCH monitoring occasions scheduling a scheduled cell and a second set of PDCCH monitoring occasions scheduling the scheduling cell.

In some aspects, a non-transitory computer-readable medium storing a set of instructions for wireless communication includes one or more instructions that, when executed by one or more processors of a network entity, cause the network entity to: receive a capability indication identifying a search space sharing capability for a mobile station on a scheduling cell; and transmit, on the scheduling cell, a first set of PDCCH communications scheduling the scheduled cell and a second set of PDCCH communications scheduling the scheduling cell.

In some aspects, an apparatus for wireless communication includes means for transmitting a capability indication identifying a search space sharing capability for the apparatus on a scheduling cell; and means for monitoring, on the scheduling cell, a first set of PDCCH monitoring occasions scheduling a scheduled cell and a second set of PDCCH monitoring occasions scheduling the scheduling cell.

In some aspects, an apparatus for wireless communication includes means for receiving a capability indication identifying a search space sharing capability for a mobile station on a scheduling cell; and means for transmitting, on the scheduling cell, a first set of PDCCH communications scheduling the scheduled cell and a second set of PDCCH communications scheduling the scheduling cell.

Aspects generally include a method, apparatus, system, computer program product, non-transitory computer-readable medium, user equipment, base station, network node, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
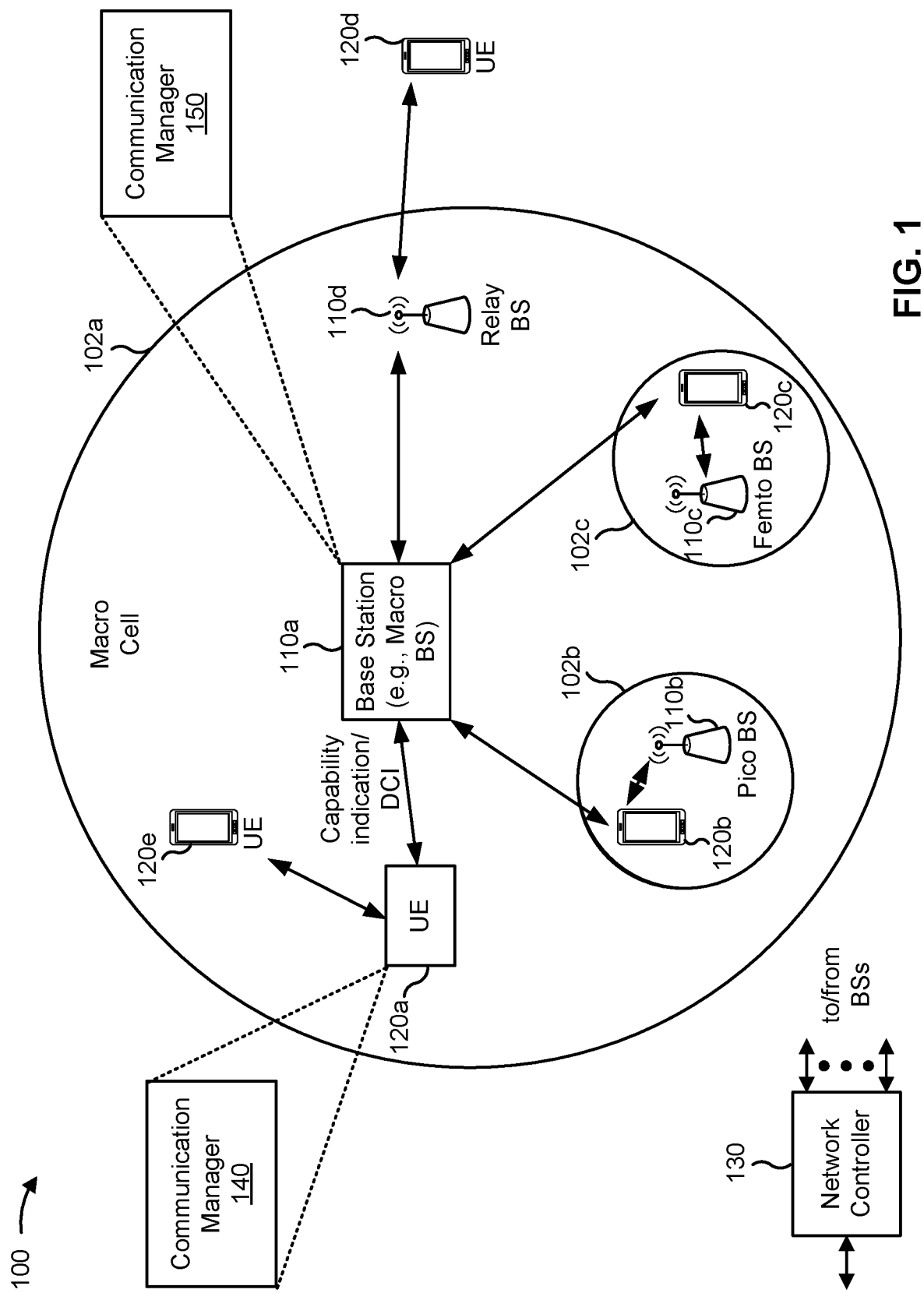
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station, which may correspond to a UE 120 described herein, may include a communication manager 140. As described in more detail elsewhere herein, the communication manager 140 may transmit a capability indication identifying a search space sharing capability for the mobile station on a scheduling cell; and monitor, on the scheduling cell, a first set of physical downlink control channel (PDCCH) monitoring occasions scheduling a scheduled cell and a second set of PDCCH monitoring occasions scheduling the scheduling cell. In some aspects, the UE 120 may receive downlink control information (DCI) in a PDCCH monitoring occasion. Additionally, or alternatively, the communication manager 140 may perform one or more other operations described herein.

In some aspects, the base station 110 may include a communication manager 150. As described in more detail elsewhere herein, the communication manager 150 may receive a capability indication identifying a search space sharing capability for a mobile station on a scheduling cell; and transmit, on the scheduling cell, a first set of PDCCH communications scheduling the scheduled cell and a second set of PDCCH communications scheduling the scheduling cell. In some aspects, the base station 110 may transmit DCI in a PDCCH communication. Additionally, or alternatively, the communication manager 150 may perform one or more other operations described herein.

As indicated above, FIG. 1 is provided as an example. Other examples may differ from what is described with regard to FIG. 1.

Figure 2:
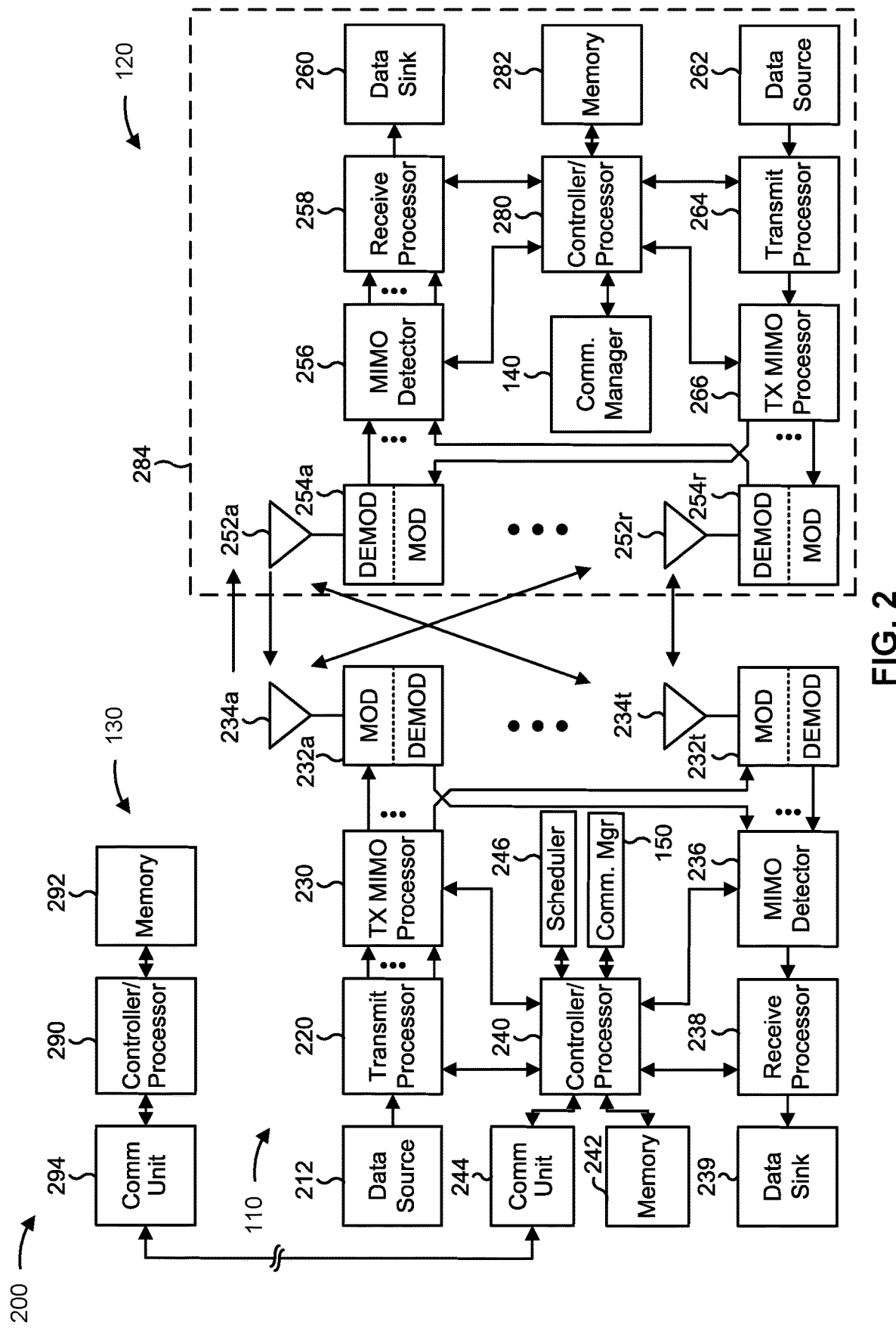
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-9.)

The controller/processor 240 of the base station 110, the controller/processor 280 of the UE 120, and/or any other component(s) of FIG. 2 may perform one or more techniques associated with search space sharing for cross-carrier scheduling, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a mobile station includes means for transmitting a capability indication identifying a search space sharing capability for the mobile station on a scheduling cell; and/or means for monitoring, on the scheduling cell, a first set of PDCCH monitoring occasions scheduling a scheduled cell and a second set of PDCCH monitoring occasions scheduling the scheduling cell. In some aspects, the means for the mobile station to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a base station includes means for receiving a capability indication identifying a search space sharing capability for a mobile station on a scheduling cell; and/or means for transmitting, on the scheduling cell, a first set of PDCCH communications scheduling the scheduled cell and a second set of PDCCH communications scheduling the scheduling cell. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
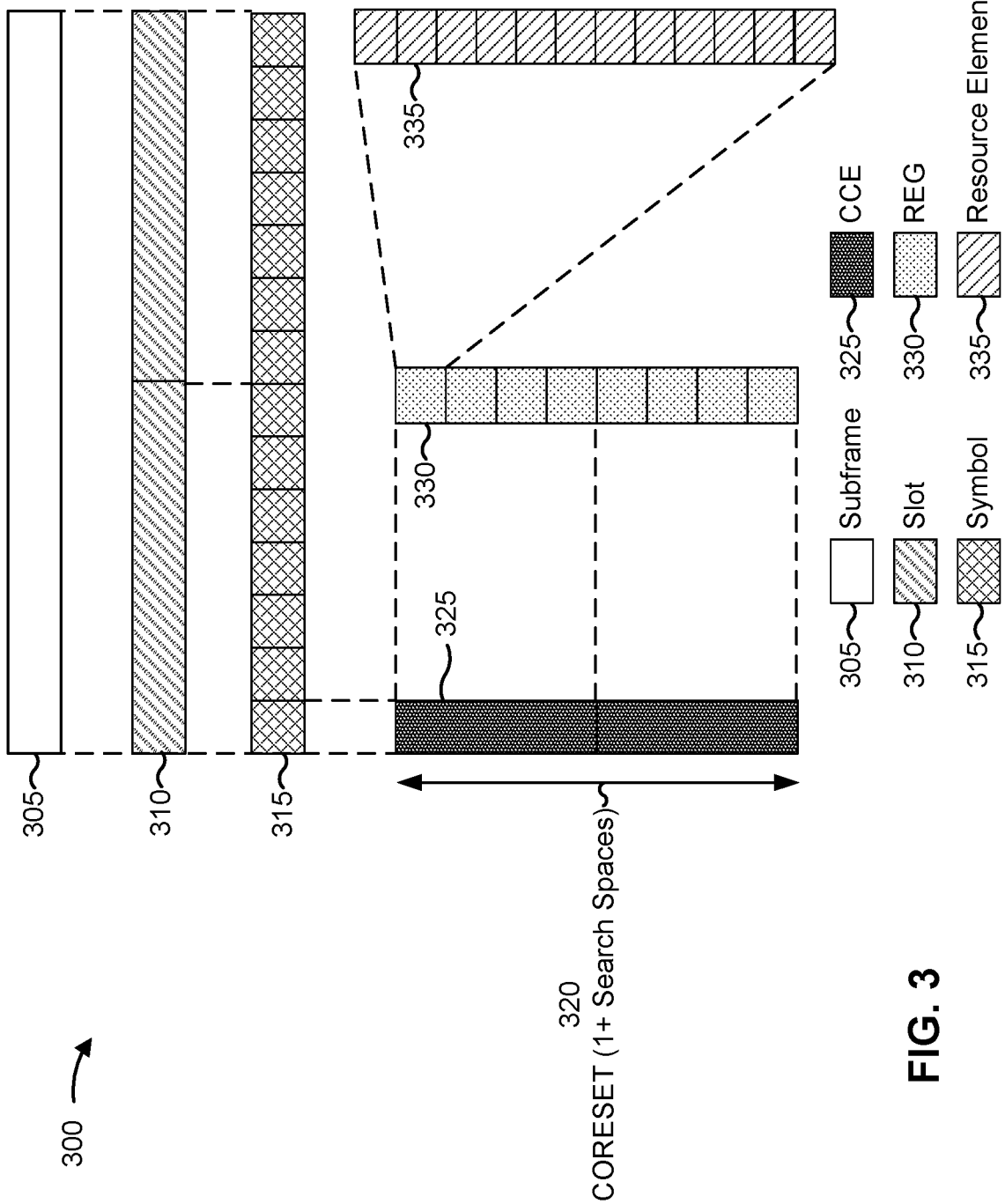
FIG. 3 is a diagram illustrating an example of a resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include DCI that is used to provide control information for wireless communication. A network entity may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
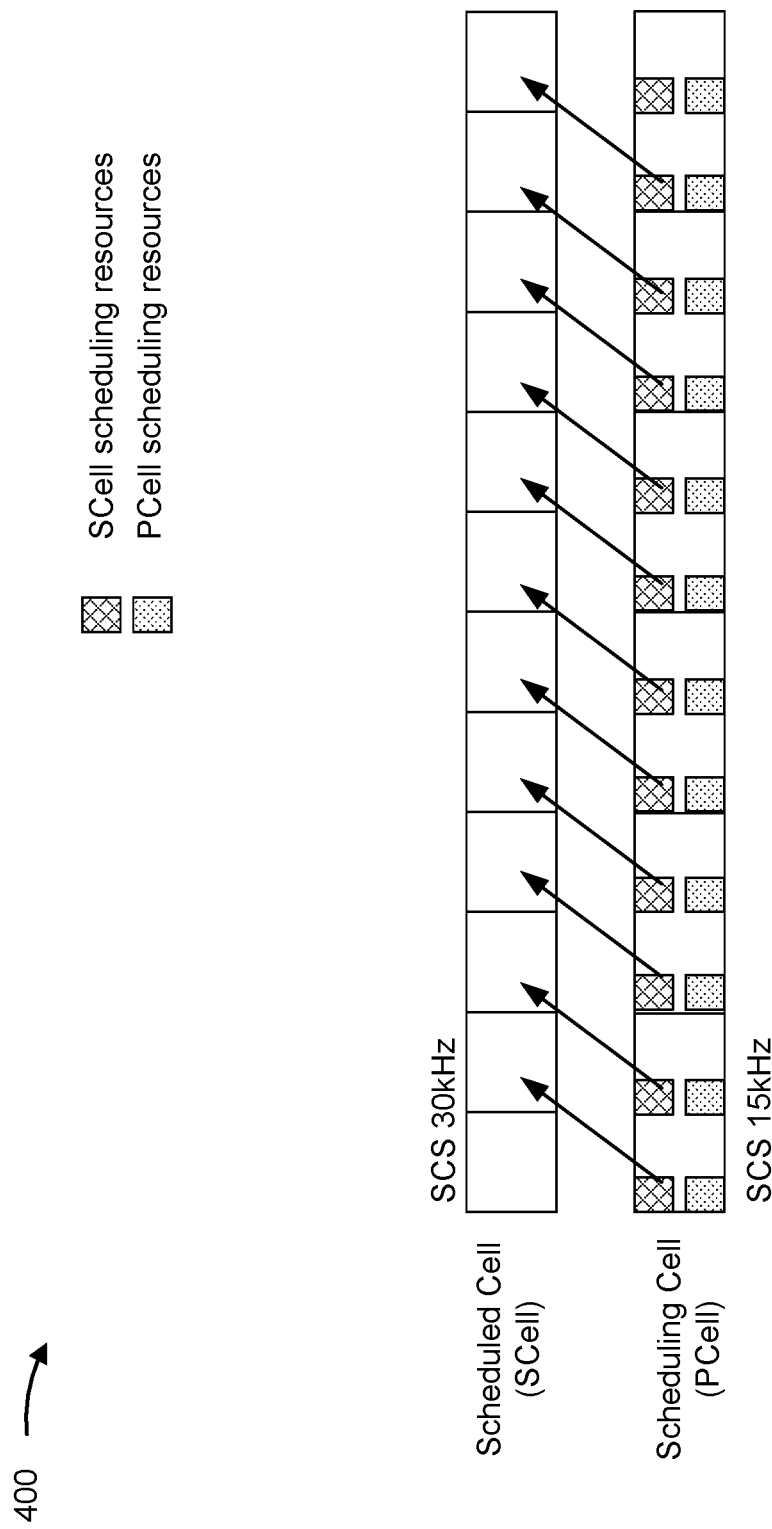
FIG. 4 is a diagram illustrating an example of cross-carrier scheduling, in accordance with the present disclosure.

FIG. 4 is a diagram illustrating an example 400 of cross-carrier scheduling, in accordance with the present disclosure.

As shown in FIG. 4, in a cross-carrier scheduling scenario, a first carrier may have resources for scheduling communication on a second carrier. For example, a scheduling cell may include first resources that are used for cross-carrier scheduling on a scheduled cell (e.g., on a secondary cell (SCell)) and second resources that are used for self-scheduling on the scheduling cell (e.g., on a primary cell (PCell)). In cross-carrier scheduling, a first search space is configured on the scheduling cell (e.g., a PCell) with a particular identifier and a second search space is configured on the scheduled cell (e.g., an SCell) with the same particular identifier. A UE may monitor the scheduling cell search space for PDCCH candidates based at least in part on a configuration of the scheduling cell search space.

The UE may identify, in a configuration of the scheduled cell search space, a quantity of candidates (nrofCandidates) for each aggregation level, which may enable the UE to identify PDCCH candidates that correspond to the scheduled cell when monitoring on the scheduling cell. In other words, when the scheduling cell search space configuration identifies a quantity of candidates as 4 and the scheduled cell identifies a quantity of candidates as 2, a UE may associate candidates with a carrier indicator field (CIF) of 0 as relating to the scheduling cell and candidates with a CIF of 1 as relating to the scheduled cell.

Similarly, in dynamic spectrum sharing (DSS) with cross-carrier scheduling there can be two scheduling cells for data scheduling on a PCell or a primary secondary cell (PSCell). In this case, the PCell (or PSCell) may have a common search space for scheduling data on the PCell (or PSCell) and the SCell may have a UE-specific search space (USS) for scheduling data on the PCell (or PSCell). In DSS cross-carrier scheduling, a PCell or PSCell USS and an SCell USS (e.g., with a CIF of 1) may schedule a communication on the PCell or PSCell, and an SCell USS (e.g., with a CIF of 0) may schedule a communication on the SCell.

A UE may enable search space sharing by transmitting a UE capability message with a parameter identifying a UE capability for search space sharing. In this case, a network entity may determine that the UE is capable of receiving a DCI scheduling data on a cell with a first CIF value at a PDCCH candidate corresponding to a second CIF value. However, search space configurations with common parameters between the scheduling cell and the scheduled cell may restrict flexibility with regard to usage of search space sharing. In some scenarios, a first carrier may have a different numerology than a second carrier. For example, as shown, the scheduling cell may have a subcarrier spacing (SCS) of 15 kilohertz (kHz) and the scheduled cell may have an SCS of 30 kHz.

To enable the UE to monitor PDCCH candidates on the first carrier (the scheduling cell with the 15 kHz SCS) to schedule on the second carrier (the scheduled cell with the 30 kHz SCS), the network entity configures two PDCCH monitoring occasions in each slot of the first carrier for both cross-carrier scheduling and self-scheduling. However, self-scheduling can be achieved with only one PDCCH monitoring occasion in each slot of the first carrier. As a result, the UE monitors an excessive quantity of resources, which results in more utilization of network resources, excessive utilization of UE power resources, or excessive utilization of UE processing resources, among other examples.

As indicated above, FIG. 4 is provided as an example. Other examples may differ from what is described with respect to FIG. 4.

Some aspects described herein enable different configurations for different search spaces when search space sharing is enabled. For example, a UE may receive search space configurations for a scheduling cell and a scheduled cell that have different (e.g., independent) parameter configurations, such as a different quantity of PDCCH monitoring occasions in each slot. In another example, the UE may receive separate search space configurations, such as a search space configuration in the scheduling cell indicating a scheduled cell to which the search space configuration applies or a search space configuration in the scheduled cell indicating a scheduling cell to which the search space configuration applies. In these examples, the UE may have search space sharing enabled in some PDCCH monitoring occasions and search space sharing not enabled in other PDCCH monitoring occasions, thereby allowing the UE to efficiently receive DCI in accordance with parameters of the cells to which the DCI applies (e.g., in accordance with different numerologies for different cells).

Figure 5A:
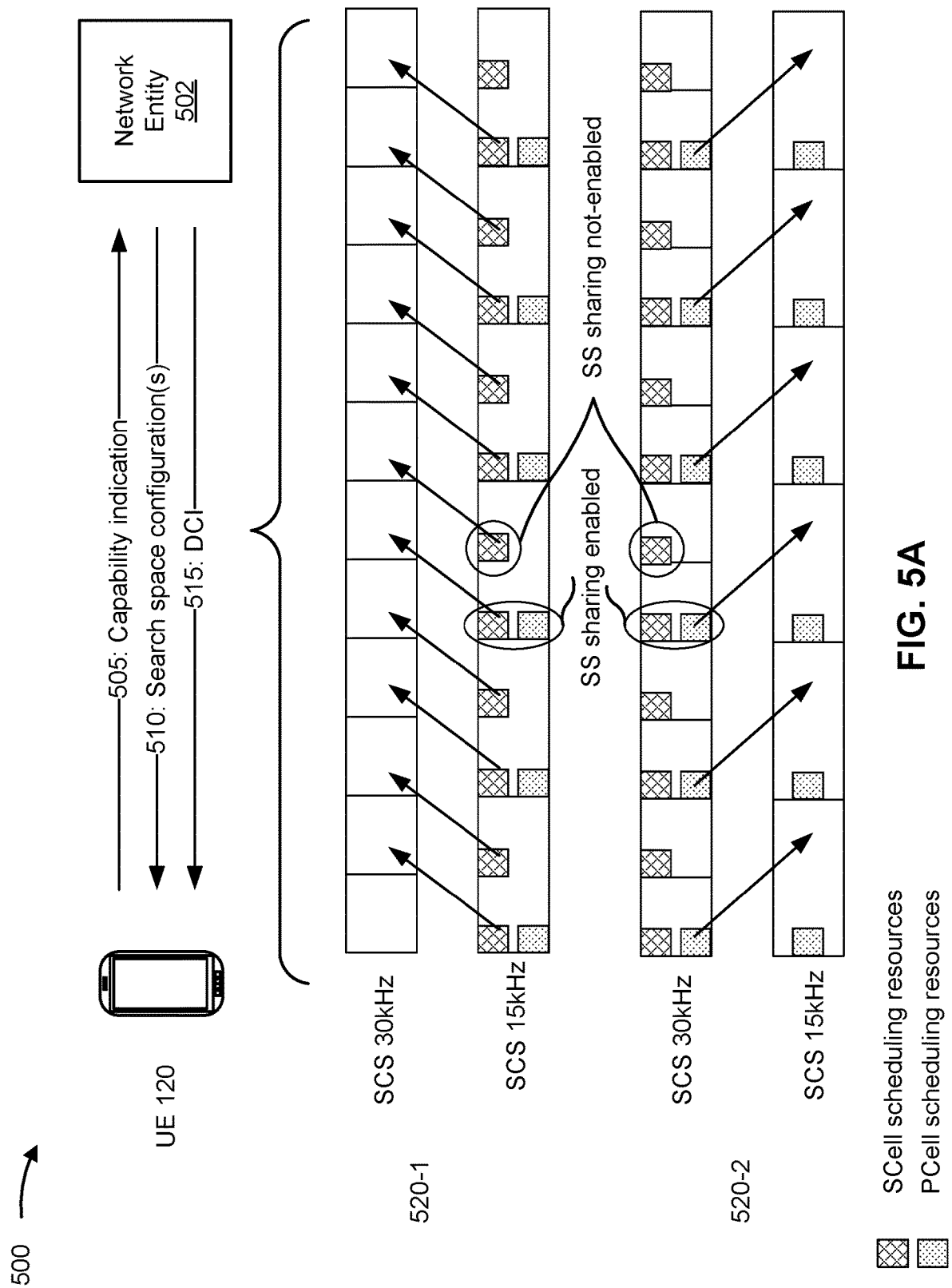
FIGS. 5A-5B are diagrams illustrating examples associated with search space sharing for cross-carrier scheduling, in accordance with the present disclosure.
Figure 5B:
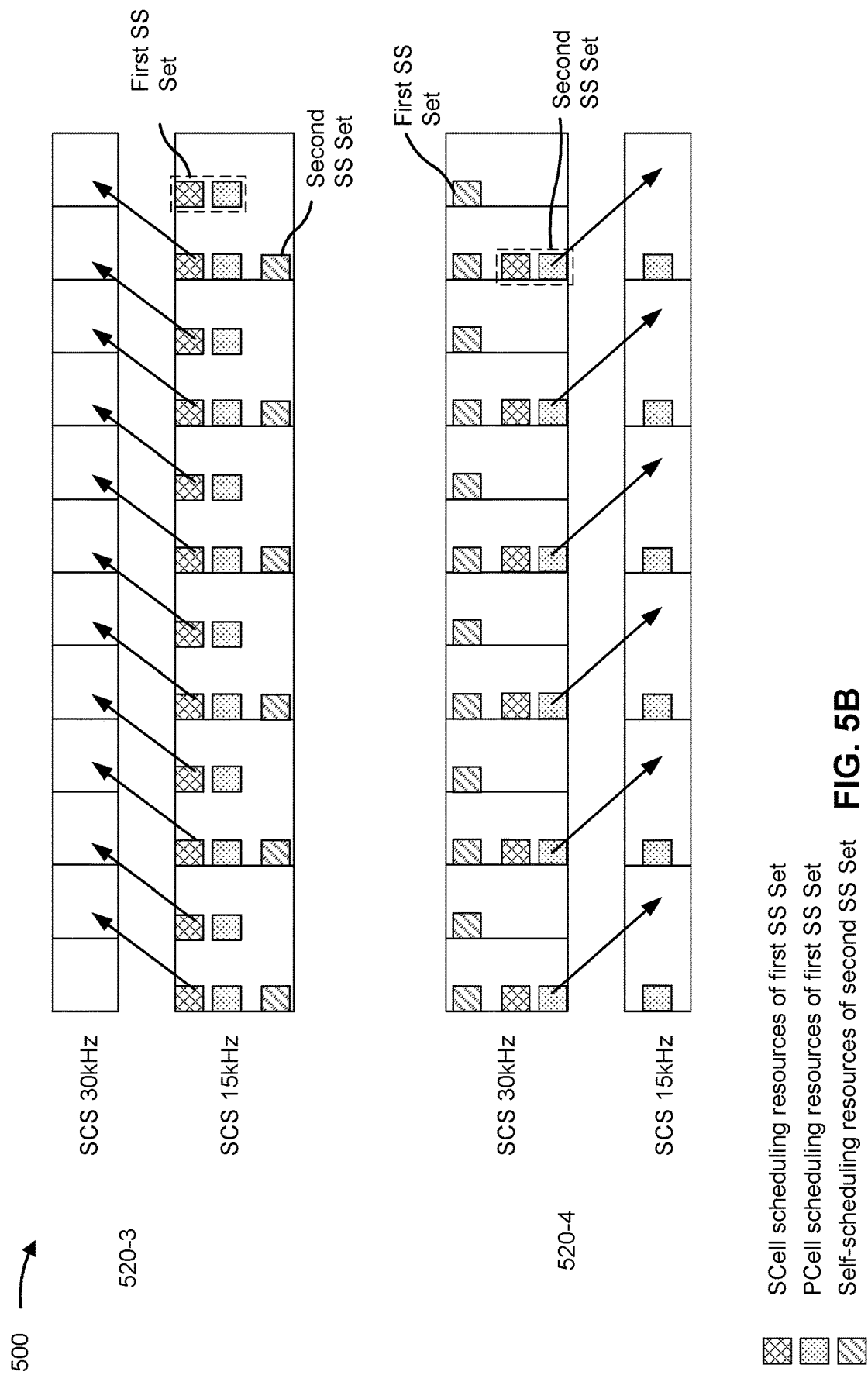

FIGS. 5A-5B are diagrams illustrating an example 500 associated with search space sharing for cross-carrier scheduling, in accordance with the present disclosure. As shown in FIG. 5A, example 500 includes communication between a network entity 502 and a UE 120 (e.g., a mobile station). In some aspects, network entity 502 and UE 120 may be included in a wireless network, such as wireless network 100. Network entity 502 and UE 120 may communicate via a wireless access link, which may include an uplink and a downlink.

As further shown in FIG. 5A, and by reference number 505, UE 120 may provide a capability indication. For example, UE 120 may transmit, to network entity 502, a capability indication identifying a search space sharing capability of UE 120. In this case, network entity 502 may receive the capability indication and configure transmission of DCI in configured PDCCH monitoring occasions. In some aspects, the capability indication may relate to a particular set of carriers or cells. For example, UE 120 may provide a capability indication to identify a search space sharing capability for a scheduling cell and a scheduled cell. In this case, the scheduling cell and the scheduled cell may have different configurations, such as different numerologies (e.g., different SCSs), among other examples.

As further shown in FIG. 5A, and by reference numbers 510 and 515, UE 120 may receive a search space configuration and may receive DCI. For example, UE 120 may receive information identifying a search space configuration for monitoring for DCI on the scheduling cell. In this case, network entity 502 may transmit DCI in one or more PDCCH monitoring occasions and UE 120 may receive the DCI (which may schedule another communication, such as a PDSCH communication or a physical uplink shared channel communication (PUSCH), among other examples).

In some aspects, the search space configuration may have first parameters for monitoring a first set of PDCCH monitoring occasions (e.g., scheduling the scheduled cell) and second parameters for monitoring a second set of PDCCH monitoring occasions (e.g., scheduling the scheduling cell). In some aspects, the PDCCH monitoring occasions may have different periodicities. For example, UE 120 may monitor the first set of PDCCH monitoring occasions with a first periodicity corresponding to a first SCS of the scheduled cell and monitor the second set of PDCCH monitoring occasions with a second periodicity corresponding to a second SCS of the scheduling cell.

In some aspects, network entity 502 and UE 120 may enable search space sharing in some PDCCH monitoring occasions. For example, as shown in diagram 520-1, search space sharing is enabled in a first PDCCH monitoring occasion in a slot and is not enabled in a second PDCCH monitoring occasion in a slot. In this way, network entity 502 can transmit DCI, in a scheduling cell with a first SCS (e.g., a PCell with a 15 kHz SCS), to schedule in a scheduled cell with a second SCS (e.g., an SCell with a 30 kHz SCS), without UE 120 monitoring an excessive amount of PDCCH occasions. In other words, UE 120 monitors two PDCCH occasions for cross-carrier scheduling resources in each slot and only one PDCCH occasion for self-scheduling resources in each slot, thereby reducing a utilization of network resources, UE power resources, or UE processing resources relative to other techniques, as shown in FIG. 4.

In another example, as shown in diagram 520-2, search space sharing is enabled in a first slot and is not enabled in a second slot. In this way, network entity 502 can transmit DCI, in a scheduling cell with the second SCS (e.g., an SCell with a 30 kHz SCS), to schedule in a scheduled cell with the first SCS (e.g., a PCell with a 15 kHz SCS), without UE 120 monitoring an excessive amount of PDCCH occasions. In other words, UE 120 monitors cross-carrier scheduling resources and self-scheduling resources in a first slot on the SCell and only self-scheduling resources in the second slot on the SCell. In this way, network entity 502 and UE 120 reduce a utilization of network resources, UE power resources, or UE processing resources relative to other techniques, as shown in FIG. 4.

In another example, search space sharing can be enabled for a first set of search space set configurations and not enabled for a second set of search space set configurations.

For example, UE 120 may be configured with a first search space set x (for which cross-carrier scheduling is configured) and a second search space set y (which is only configured for a scheduling cell). In this case, search space set sharing is enabled only for search space set x and UE 120 monitors PDCCH candidates for the scheduling cell and for the scheduled cell based at least in part on a configuration of search space set x. UE 120 may detect DCI for scheduling data on the scheduled cell at a PDCCH candidate for the scheduling cell and/or may detect DCI for scheduling data on the scheduling cell at a PDCCH candidate for the scheduled cell.

In some aspects, UE 120 may monitor a plurality of search space sets (e.g., a search space set for DCI scheduling a PDSCH and a search space set for DCI scheduling a PUSCH) associated with a plurality of search space configurations. For example, UE 120 may monitor a first search space set with resources for both self-scheduling and cross-carrier scheduling (e.g., with a first search space identifier) and a second search space set with resources only for self-scheduling (e.g., with a second search space identifier). In this case, the first search space set and the second search space set may have different monitoring occasions.

As an example of multiple search space sets, as shown in FIG. 5B and diagram 520-3, a first search space set on the PCell may have a periodicity corresponding to an SCS of the SCell, and a second search space set on the PCell (or in some cases, a PSCell) may have a periodicity corresponding to an SCS of the PCell. In this way, network entity 502 and UE 120 can configure different search space sets to enable UE 120 to receive DCI without using excess resources (e.g., without the second search space occurring twice in each slot). Similarly, as shown in diagram 520-4, a first search space set on the SCell may have a periodicity corresponding to an SCS of the PCell, and a second search space set on the SCell may have a periodicity corresponding to the SCell. In this way, network entity 502 and UE 120 can configure different search space sets to enable UE 120 to receive DCI without using excess resources (e.g., without the first search space occurring in each slot).

As indicated above, FIGS. 5A-5B are provided as an example. Other examples may differ from what is described with respect to FIGS. 5A-5B.

Figure 6:
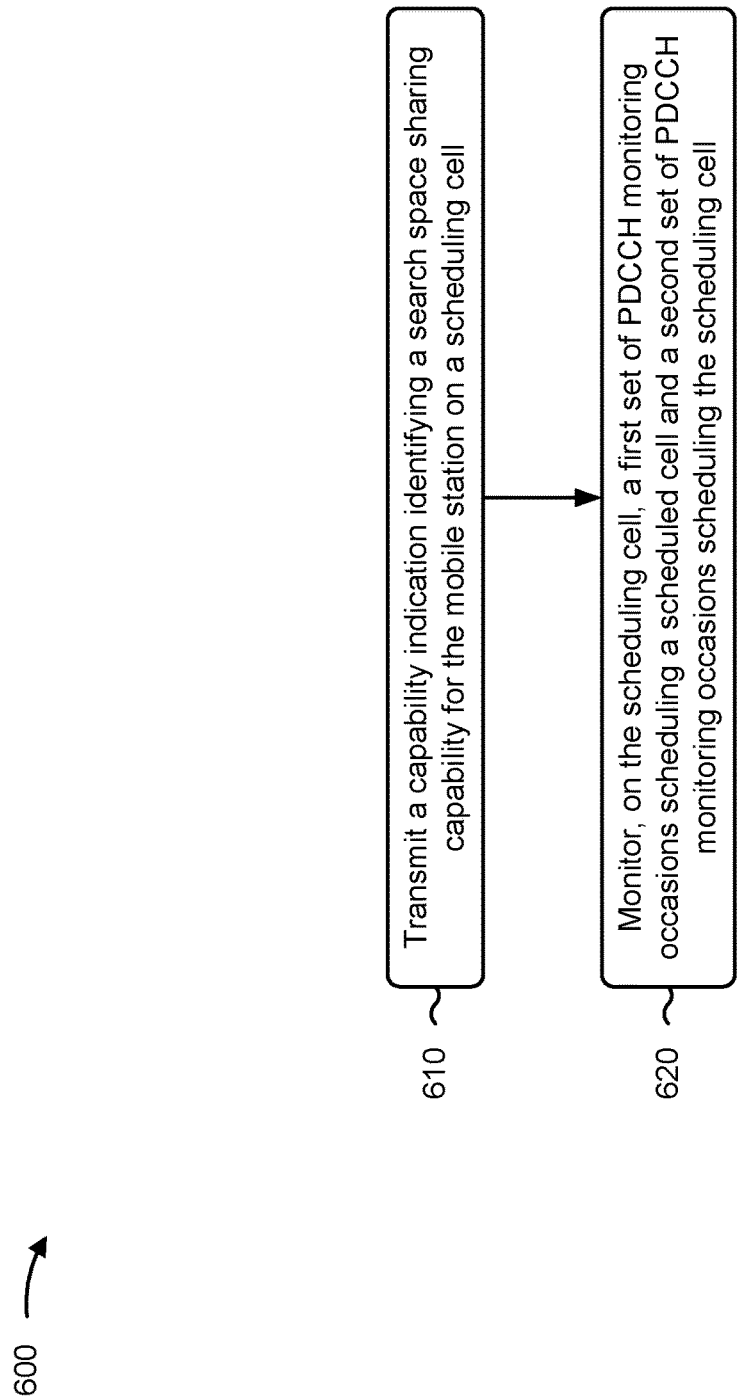
FIGS. 6-7 are diagrams illustrating example processes associated with search space sharing for cross-carrier scheduling, in accordance with the present disclosure.

FIG. 6 is a diagram illustrating an example process 600 performed, for example, by a mobile station, in accordance with the present disclosure. Example process 600 is an example where the mobile station (e.g., UE 120) performs operations associated with search space sharing for cross-carrier scheduling.

As shown in FIG. 6, in some aspects, process 600 may include transmitting a capability indication identifying a search space sharing capability for the mobile station on a scheduling cell (block 610). For example, the mobile station (e.g., using communication manager 140 and/or transmission component 804, depicted in FIG. 8) may transmit a capability indication identifying a search space sharing capability for the mobile station on a scheduling cell, as described above.

As further shown in FIG. 6, in some aspects, process 600 may include monitoring, on the scheduling cell, a first set of PDCCH monitoring occasions scheduling a scheduled cell and a second set of PDCCH monitoring occasions scheduling the scheduling cell (block 620). For example, the mobile station (e.g., using communication manager 140 and/or monitoring component 808, depicted in FIG. 8) may monitor, on the scheduling cell, a first set of PDCCH monitoring occasions scheduling a scheduled cell and a second set of PDCCH monitoring occasions scheduling the scheduling cell, as described above.

Process 600 may include additional aspects, such as any single aspect or any combination of aspects described below and/or in connection with one or more other processes described elsewhere herein.

In a first aspect, the scheduled cell has a first subcarrier spacing and the scheduling cell has a second subcarrier spacing.

In a second aspect, alone or in combination with the first aspect, the first set of PDCCH monitoring occasions has a first periodicity corresponding to the first subcarrier spacing and the second set of PDCCH monitoring occasions has a second periodicity corresponding to the second subcarrier spacing.

In a third aspect, alone or in combination with one or more of the first and second aspects, search space sharing, associated with the search space sharing capability, is enabled on the second set of PDCCH monitoring occasions, wherein the second set of PDCCH monitoring occasions is a subset of the first set of PDCCH monitoring occasions.

In a fourth aspect, alone or in combination with one or more of the first through third aspects, downlink control information is receivable for the scheduled cell on the first set of PDCCH monitoring occasions and for the scheduling cell on the second set of PDCCH monitoring occasions.

In a fifth aspect, alone or in combination with one or more of the first through fourth aspects, search space sharing is enabled on the first set of PDCCH monitoring occasions, wherein the second set of PDCCH monitoring occasions is a subset of the first set of PDCCH monitoring occasions.

In a sixth aspect, alone or in combination with one or more of the first through fifth aspects, downlink control information is receivable for the scheduled cell on the first set of PDCCH monitoring occasions and for the scheduling cell on the first set of PDCCH monitoring occasions.

In a seventh aspect, alone or in combination with one or more of the first through sixth aspects, the scheduling cell is a primary cell and the scheduled cell is a secondary cell.

In an eighth aspect, alone or in combination with one or more of the first through seventh aspects, the scheduling cell is a secondary cell and the scheduled cell is a primary cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
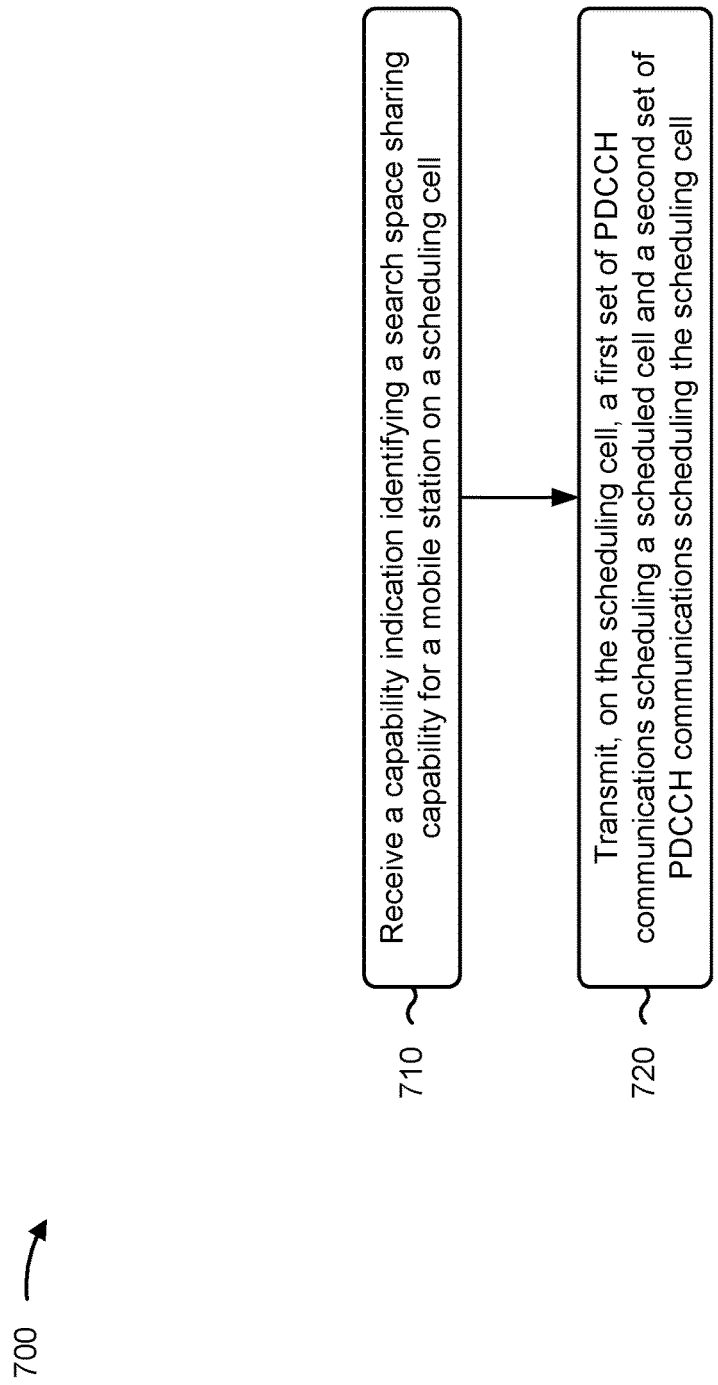

FIG. 7 is a diagram illustrating an example process 700 performed, for example, by a network entity, in accordance with the present disclosure. Example process 700 is an example where the network entity (e.g., base station 110 or one or more of the components described herein with regard to FIG. 10, among other examples) performs operations associated with search space sharing for cross-carrier scheduling.

As shown in FIG. 7, in some aspects, process 700 may include receiving a capability indication identifying a search space sharing capability for a mobile station on a scheduling cell (block 710). For example, the network entity (e.g., using communication manager 150 and/or reception component 902, depicted in FIG. 9) may receive a capability indication identifying a search space sharing capability for a mobile station on a scheduling cell, as described above.

As further shown in FIG. 7, in some aspects, process 700 may include transmitting, on the scheduling cell, a first set of PDCCH communications scheduling the scheduled cell and a second set of PDCCH communications scheduling the scheduling cell (block 720). For example, the network entity (e.g., using communication manager 150 and/or transmission component 904, depicted in FIG. 9) may transmit, on the scheduling cell, a first set of PDCCH communications scheduling the scheduled cell and a second set of PDCCH communications scheduling the scheduling cell, as described above.

Process 700 may include additional aspects, such as any single aspect or any combination of aspects described below and/or in connection with one or more other processes described elsewhere herein.

In a first aspect, the scheduled cell has a first subcarrier spacing and the scheduling cell has a second subcarrier spacing.

In a second aspect, alone or in combination with the first aspect, the first set of PDCCH communications has a first periodicity corresponding to the first subcarrier spacing and the second set of PDCCH communications has a second periodicity corresponding to the second subcarrier spacing.

In a third aspect, alone or in combination with one or more of the first and second aspects, search space sharing, associated with the search space sharing capability, is enabled on monitoring occasions corresponding to the second set of PDCCH communications, wherein the monitoring occasions corresponding to the second set of PDCCH communications is a subset of monitoring occasions corresponding to the first set of PDCCH communications.

In a fourth aspect, alone or in combination with one or more of the first through third aspects, downlink control information is transmitted for the scheduled cell on the first set of PDCCH communications and for the scheduling cell on the second set of PDCCH communications.

In a fifth aspect, alone or in combination with one or more of the first through fourth aspects, search space sharing is enabled on monitoring occasions corresponding to the first set of PDCCH communications, wherein monitoring occasions corresponding to the second set of PDCCH communications is a subset of the monitoring occasions corresponding to the first set of PDCCH communications.

In a sixth aspect, alone or in combination with one or more of the first through fifth aspects, downlink control information is transmitted for the scheduled cell on the first set of PDCCH communications and for the scheduling cell on the first set of PDCCH communications.

In a seventh aspect, alone or in combination with one or more of the first through sixth aspects, the scheduling cell is a primary cell and the scheduled cell is a secondary cell.

In an eighth aspect, alone or in combination with one or more of the first through seventh aspects, the scheduling cell is a secondary cell and the scheduled cell is a primary cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
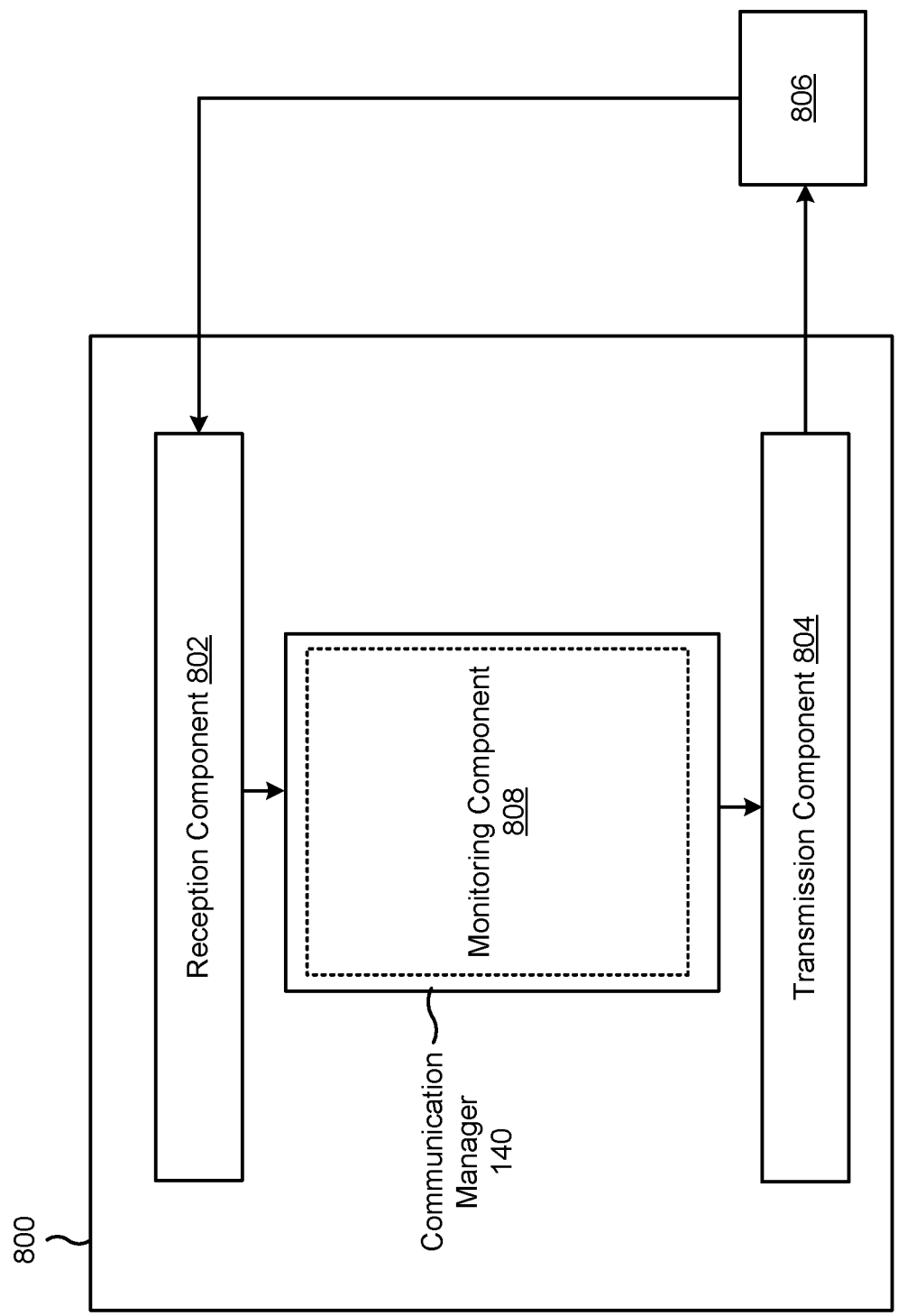
FIGS. 8-9 are block diagrams of example apparatuses for wireless communication, in accordance with the present disclosure.

FIG. 8 is a block diagram of an example apparatus 800 for wireless communication. The apparatus 800 may be a mobile station, or a mobile station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE or another wireless communication device) using the reception component 802 and the transmission component 804. As further shown, the apparatus 800 may include the communication manager 140. The communication manager 140 may include a monitoring component 808, among other examples.

In some aspects, the apparatus 800 may be configured to perform one or more operations described herein in connection with FIGS. 5A-5B. Additionally, or alternatively, the apparatus 800 may be configured to perform one or more processes described herein, such as process 600 of FIG. 6. In some aspects, the apparatus 800 and/or one or more components shown in FIG. 8 may include one or more components of the mobile station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the mobile station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the mobile station described in connection with FIG. 2. In some aspects, the transmission component 804 may be co-located with the reception component 802 in a transceiver.

The transmission component 804 may transmit a capability indication identifying a search space sharing capability for the mobile station on a scheduling cell. The monitoring component 808 may monitor, on the scheduling cell, a first set of PDCCH monitoring occasions scheduling a scheduled cell and a second set of PDCCH monitoring occasions scheduling the scheduling cell.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
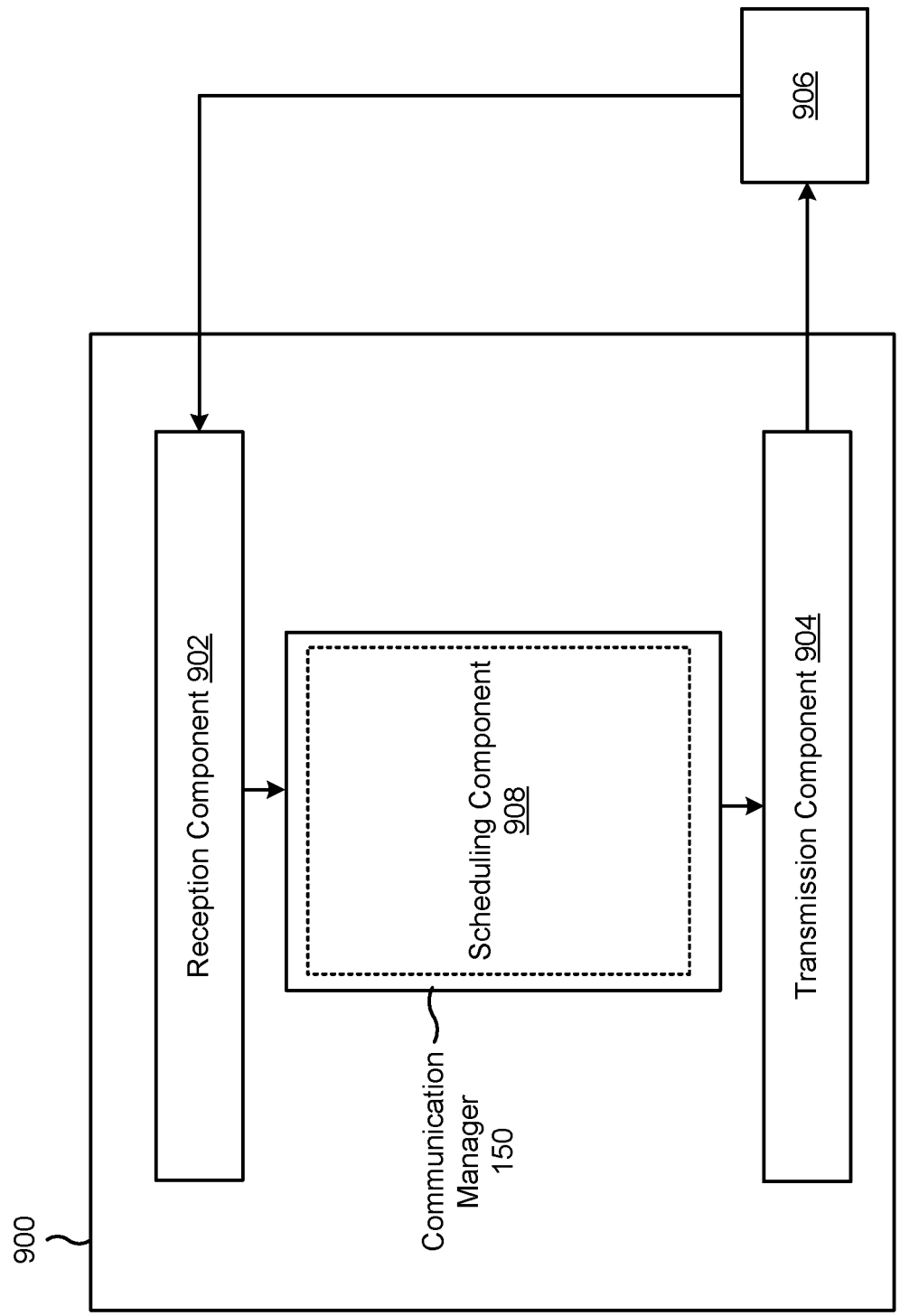

FIG. 9 is a block diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, a network entity, or another wireless communication device) using the reception component 902 and the transmission component 904. As further shown, the apparatus 900 may include the communication manager 150. The communication manager 150 may include a scheduling component 908, among other examples.

In some aspects, the apparatus 900 may be configured to perform one or more operations described herein in connection with FIGS. 5A-5B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive a capability indication identifying a search space sharing capability for a mobile station on a scheduling cell. The transmission component 904 may transmit, on the scheduling cell, a first set of PDCCH communications scheduling the scheduled cell and a second set of PDCCH communications scheduling the scheduling cell. The scheduling component 908 may schedule communications on a scheduling cell or a scheduled cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
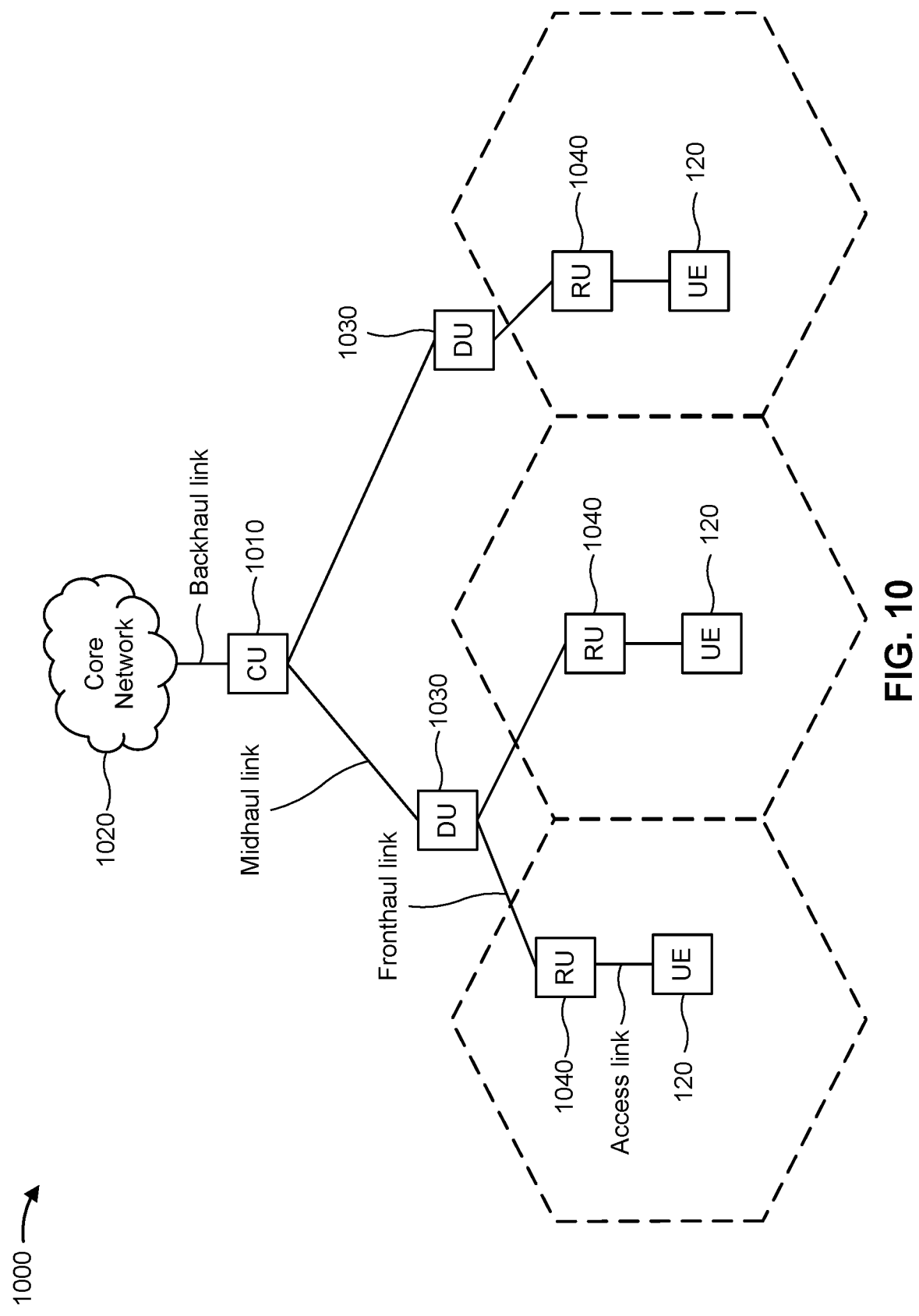
FIG. 10 is a diagram illustrating an example of an open radio access network (O-RAN) architecture, in accordance with the present disclosure.

FIG. 10 is a diagram illustrating an example 1000 of an open radio access network (O-RAN) architecture, in accordance with the present disclosure. As shown in FIG. 10, the O-RAN architecture may include a control unit (CU) 1010 that communicates with a core network 1020 via a backhaul link. Furthermore, the CU 1010 may communicate with one or more distributed units (DUs) 1030 via respective midhaul links. The DUs 1030 may each communicate with one or more radio units (RUs) 1040 via respective fronthaul links, and the RUs 1040 may each communicate with respective UEs 120 via radio frequency (RF) access links. The DUs 1030 and the RUs 1040 may also be referred to as O-RAN DUs (O-DUs) 1030 and O-RAN RUs (O-RUs) 1040, respectively.

The DUs 1030 and the RUs 1040 may be implemented according to a functional split architecture in which functionality of a base station 110 (e.g., an eNB or a gNB) is provided by a DU 1030 and one or more RUs 1040 that communicate over a fronthaul link. Accordingly, as described herein, a base station 110 may include a DU 1030 and one or more RUs 1040 that may be co-located or geographically distributed. In some aspects, the DU 1030 and the associated RU(s) 1040 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1030 may correspond to a logical unit that includes one or more base station functions to control the operation of one or more RUs 1040. For example, in some aspects, the DU 1030 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), RRC, and/or service data adaptation protocol (SDAP), may be hosted by the CU 1010. The RU(s) 1040 controlled by a DU 1030 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 1040 handle all over the air (OTA) communication with a UE 120, and real-time and non-real-time aspects of control and user plane communication with the RU(s) 1040 are controlled by the corresponding DU 1030, which enables the DU(s) 1030 and the CU 1010 to be implemented in a cloud-based RAN architecture.

As indicated above, FIG. 10 is provided as an example. Other examples may differ from what is described with regard to FIG. 10.

The following provides an overview of some Aspects of the present disclosure:

Aspect 1: A method of wireless communication performed by a mobile station, comprising: transmitting, by the mobile station, a capability indication identifying a search space sharing capability for the mobile station on a scheduling cell; and monitoring, by the mobile station and on the scheduling cell, a first set of physical downlink control channel (PDCCH) monitoring occasions scheduling a scheduled cell and a second set of PDCCH monitoring occasions scheduling the scheduling cell.

Aspect 2: The method of Aspect 1, wherein the scheduled cell has a first subcarrier spacing and the scheduling cell has a second subcarrier spacing.

Aspect 3: The method of Aspect 2, wherein the first set of PDCCH monitoring occasions has a first periodicity corresponding to the first subcarrier spacing and the second set of PDCCH monitoring occasions has a second periodicity corresponding to the second subcarrier spacing.

Aspect 4: The method of any of Aspects 1 to 3, wherein search space sharing, associated with the search space sharing capability, is enabled on the second set of PDCCH monitoring occasions, wherein the second set of PDCCH monitoring occasions is a subset of the first set of PDCCH monitoring occasions.

Aspect 5: The method of Aspect 4, wherein downlink control information is receivable for the scheduled cell on the first set of PDCCH monitoring occasions and for the scheduling cell on the second set of PDCCH monitoring occasions.

Aspect 6: The method of any of Aspects 1 to 5, wherein search space sharing is enabled on the first set of PDCCH monitoring occasions, wherein the second set of PDCCH monitoring occasions is a subset of the first set of PDCCH monitoring occasions.

Aspect 7: The method of Aspect 6, wherein downlink control information is receivable for the scheduled cell on the first set of PDCCH monitoring occasions and for the scheduling cell on the first set of PDCCH monitoring occasions.

Aspect 8: The method of any of Aspects 1 to 7, wherein the monitoring comprises: monitoring a plurality of PDCCH monitoring occasions, the plurality of PDCCH monitoring occasions comprising the first set of PDCCH monitoring occasions and the second set of PDCCH monitoring occasions, and wherein the plurality of PDCCH monitoring occasions comprises at least one subset of PDCCH monitoring occasions associated with a first search space identifier and a first search space set for self-scheduling, and comprises at least one subset of PDCCH monitoring occasions associated with a second search space identifier and a second search space set for cross-carrier scheduling.

Aspect 9: The method of Aspect 8, wherein the second search space identifier is for cross-carrier scheduling and self-scheduling, and wherein the second search space set comprises the first set of PDCCH monitoring occasions and the second set of PDCCH monitoring occasions.

Aspect 10: The method of any of Aspects 1 to 9, wherein the scheduling cell is a primary cell and the scheduled cell is a secondary cell.

Aspect 11: The method of any of Aspects 1 to 10, wherein the scheduling cell is a secondary cell and the scheduled cell is a primary cell.

Aspect 12: The method of any of Aspects 1 to 11, wherein search space sharing is only enabled on the first set of PDCCH monitoring occasions.

Aspect 13: The method of any of Aspects 1 to 12, wherein search space sharing is enabled on the first set of PDCCH monitoring occasions and the second set of PDCCH monitoring occasions.

Aspect 14: A method of wireless communication performed by a network entity, comprising: receiving, by the network entity, a capability indication identifying a search space sharing capability for a mobile station on a scheduling cell; and transmitting, by the network entity and on the scheduling cell, a first set of physical downlink control channel (PDCCH) communications scheduling the scheduled cell and a second set of PDCCH communications scheduling the scheduling cell.

Aspect 15: The method of Aspect 12, wherein the scheduled cell has a first subcarrier spacing and the scheduling cell has a second subcarrier spacing.

Aspect 16: The method of Aspect 13, wherein the first set of PDCCH communications has a first periodicity corresponding to the first subcarrier spacing and the second set of PDCCH communications has a second periodicity corresponding to the second subcarrier spacing.

Aspect 17: The method of any of Aspects 12 to 14, wherein search space sharing, associated with the search space sharing capability, is enabled on monitoring occasions corresponding to the second set of PDCCH communications, wherein the monitoring occasions corresponding to the second set of PDCCH communications is a subset of monitoring occasions corresponding to the first set of PDCCH communications.

Aspect 18: The method of Aspect 15, wherein downlink control information is transmitted for the scheduled cell on the first set of PDCCH communications and for the scheduling cell on the second set of PDCCH communications.

Aspect 19: The method of any of Aspects 12 to 16, wherein search space sharing is enabled on monitoring occasions corresponding to the first set of PDCCH communications, wherein monitoring occasions corresponding to the second set of PDCCH communications is a subset of the monitoring occasions corresponding to the first set of PDCCH communications.

Aspect 20: The method of Aspect 17, wherein downlink control information is transmitted for the scheduled cell on the first set of PDCCH communications and for the scheduling cell on the first set of PDCCH communications.

Aspect 21: The method of any of Aspects 12 to 18, wherein the transmitting comprises: transmitting a plurality of PDCCH communications, the plurality of PDCCH communications comprising the first set of PDCCH communications and the second set of PDCCH communications, and wherein the plurality of PDCCH communications comprises at least one subset of PDCCH communications associated with a first search space identifier and a first search space set for self-scheduling, and comprises at least one subset of PDCCH communications associated with a second search space identifier and a second search space set for cross-carrier scheduling.

Aspect 22: The method of Aspect 19, wherein the second search space identifier is for cross-carrier scheduling and self-scheduling, and wherein the second search space set comprises the first set of PDCCH communications and the second set of PDCCH communications.

Aspect 23: The method of any of Aspects 12 to 20, wherein the scheduling cell is a primary cell and the scheduled cell is a secondary cell.

Aspect 24: The method of any of Aspects 12 to 20, wherein the scheduling cell is a secondary cell and the scheduled cell is a primary cell.

Aspect 25: The method of any of Aspects 12 to 21, wherein search space sharing is only enabled on the first set of PDCCH monitoring occasions.

Aspect 26: The method of any of Aspects 12 to 22, wherein search space sharing is enabled on the first set of PDCCH monitoring occasions and the second set of PDCCH monitoring occasions.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
one or more memories; and
one or more processors, based at least in part on information stored in the one or more memories, configured to:
transmit a capability indication identifying a search space sharing capability for a scheduling cell and a scheduled cell, wherein the scheduling cell and the scheduled cell have different subcarrier spacings; and
monitor, on the scheduling cell, a first set of physical downlink control channel (PDCCH) monitoring occasions scheduling the scheduled cell and a second set of PDCCH monitoring occasions scheduling the scheduling cell.

2. The apparatus of claim 1, wherein search space sharing is only enabled on the first set of PDCCH monitoring occasions.

3. The apparatus of claim 1, wherein search space sharing is enabled on the first set of PDCCH monitoring occasions and the second set of PDCCH monitoring occasions.

4. The apparatus of claim 1, wherein the first set of PDCCH monitoring occasions has a first periodicity corresponding to a first subcarrier spacing of the scheduled cell and the second set of PDCCH monitoring occasions has a second periodicity corresponding to a second subcarrier spacing of the scheduling cell.

5. The apparatus of claim 1, wherein search space sharing, associated with the search space sharing capability, is enabled on the second set of PDCCH monitoring occasions, wherein the second set of PDCCH monitoring occasions is a subset of the first set of PDCCH monitoring occasions.

6. The apparatus of claim 5, wherein downlink control information is receivable for the scheduled cell on the first set of PDCCH monitoring occasions and for the scheduling cell on the second set of PDCCH monitoring occasions.

7. The apparatus of claim 1, wherein search space sharing is enabled on the first set of PDCCH monitoring occasions, wherein the second set of PDCCH monitoring occasions is a subset of the first set of PDCCH monitoring occasions.

8. The apparatus of claim 7, wherein downlink control information is receivable for the scheduled cell on the first set of PDCCH monitoring occasions and for the scheduling cell on the first set of PDCCH monitoring occasions.

9. The apparatus of claim 1, wherein the one or more processors configured to monitor the first set of PDCCH monitoring occasions are further configured to:
monitor a plurality of PDCCH monitoring occasions, the plurality of PDCCH monitoring occasions comprising the first set of PDCCH monitoring occasions and the second set of PDCCH monitoring occasions,
wherein the plurality of PDCCH monitoring occasions comprises at least one subset of PDCCH monitoring occasions associated with a first search space identifier and a first search space set for self-scheduling, and comprises at least one subset of PDCCH monitoring occasions associated with a second search space identifier and a second search space set for cross-carrier scheduling.

10. The apparatus of claim 9, wherein the second search space identifier is for cross-carrier scheduling and self-scheduling, and wherein the second search space set comprises the first set of PDCCH monitoring occasions and the second set of PDCCH monitoring occasions.

11. The apparatus of claim 1, wherein the scheduling cell is a primary cell and the scheduled cell is a secondary cell.

12. The apparatus of claim 1, wherein the scheduling cell is a secondary cell and the scheduled cell is a primary cell.

13. An apparatus for wireless communication at a network entity, comprising:
one or more memories; and
one or more processors, based at least in part on information stored in the one or more memories, configured to:
receive a capability indication identifying a search space sharing capability for a scheduling cell and a scheduled cell, wherein the scheduling cell and the scheduled cell have different subcarrier spacings; and
transmit, on the scheduling cell, a first set of physical downlink control channel (PDCCH) communications scheduling the scheduled cell and a second set of PDCCH communications scheduling the scheduling cell.

14. The apparatus of claim 13, wherein search space sharing is only enabled on the first set of PDCCH monitoring occasions.

15. The apparatus of claim 13, wherein search space sharing is enabled on the first set of PDCCH monitoring occasions and the second set of PDCCH monitoring occasions.

16. The apparatus of claim 13, wherein the first set of PDCCH communications has a first periodicity corresponding to a first subcarrier spacing of the scheduled cell and the second set of PDCCH communications has a second periodicity corresponding to a second subcarrier spacing of the scheduling cell.

17. The apparatus of claim 13, wherein search space sharing, associated with the search space sharing capability, is enabled on monitoring occasions corresponding to the second set of PDCCH communications, wherein the monitoring occasions corresponding to the second set of PDCCH communications are a subset of monitoring occasions corresponding to the first set of PDCCH communications.

18. The apparatus of claim 17, wherein downlink control information is transmitted for the scheduled cell on the first set of PDCCH communications and for the scheduling cell on the second set of PDCCH communications.

19. The apparatus of claim 13, wherein search space sharing is enabled on monitoring occasions corresponding to the first set of PDCCH communications, wherein monitoring occasions corresponding to the second set of PDCCH communications are a subset of the monitoring occasions corresponding to the first set of PDCCH communications.

20. The apparatus of claim 19, wherein downlink control information is transmitted for the scheduled cell on the first set of PDCCH communications and for the scheduling cell on the first set of PDCCH communications.

21. The apparatus of claim 13, wherein the one or more processors configured to transmit the first set of PDCCH monitoring occasions are further configured to:
   transmit a plurality of PDCCH communications, the plurality of PDCCH communications comprising the first set of PDCCH communications and the second set of PDCCH communications,
      wherein the plurality of PDCCH communications comprises at least one subset of PDCCH communications associated with a first search space identifier and a first search space set for self-scheduling, and comprises at least one subset of PDCCH communications associated with a second search space identifier and a second search space set for cross-carrier scheduling.

22. The apparatus of claim 21, wherein the second search space identifier is for cross-carrier scheduling and self-scheduling, and wherein the second search space set comprises the first set of PDCCH communications and the second set of PDCCH communications.

23. The apparatus of claim 13, wherein the scheduling cell is a primary cell and the scheduled cell is a secondary cell.

24. The apparatus of claim 13, wherein the scheduling cell is a secondary cell and the scheduled cell is a primary cell.

25. A method of wireless communication performed by a mobile station, comprising:
   transmitting a capability indication identifying a search space sharing capability for a scheduling cell and a scheduled cell, wherein the scheduling cell and the scheduled cell have different subcarrier spacings; and
   monitoring, on the scheduling cell, a first set of physical downlink control channel (PDCCH) monitoring occasions scheduling the scheduled cell and a second set of PDCCH monitoring occasions scheduling the scheduling cell.

26. The method of claim 25, wherein search space sharing is only enabled on the first set of PDCCH monitoring occasions.

27. The method of claim 25, wherein search space sharing is enabled on the first set of PDCCH monitoring occasions and the second set of PDCCH monitoring occasions.

28. A method of wireless communication performed by a network entity, comprising:
   receiving a capability indication identifying a search space sharing capability for a scheduling cell and a scheduled cell; and
   transmitting, on the scheduling cell, a first set of physical downlink control channel (PDCCH) communications scheduling the scheduled cell and a second set of PDCCH communications scheduling the scheduling cell.

29. The apparatus of claim 1, wherein the one or more processors configured to monitor the first set of PDCCH monitoring occasions are further configured to:
   monitor the first set of PDCCH monitoring occasions with a first periodicity corresponding to a first subcarrier spacing of the scheduled cell; and
   monitor the second set of PDCCH monitoring occasions with a second periodicity corresponding to a second subcarrier spacing of the scheduling cell.

30. The apparatus of claim 1, wherein the one or more processors configured to monitor the first set of PDCCH monitoring occasions are further configured to:
   receive search space configurations for the scheduling cell and the scheduled cell that have a different quantity of PDCCH monitoring occasions in each slot.

* * * * *